United States Patent [19]

Klassen et al.

[11] 4,141,147
[45] Feb. 27, 1979

[54] PUP MEASUREMENT GAUGE

[75] Inventors: George Klassen, North Delta; Murray D. Feller, Richmond, both of Canada

[73] Assignee: Lockheed Petroleum Services, Ltd., New Westminster, Canada

[21] Appl. No.: 862,930

[22] Filed: Dec. 21, 1977

[51] Int. Cl.$^2$ .......................... G01B 5/00; G01B 5/24
[52] U.S. Cl. ................................ 33/174 N; 33/180 R
[58] Field of Search ................. 33/84, 174 R, 174 G, 33/174 N, 174 Q, 180 R

[56] References Cited

U.S. PATENT DOCUMENTS

| 375,795 | 1/1888 | Beyerle | 33/174 R |
|---|---|---|---|
| 1,339,919 | 5/1920 | Cobb | 33/180 R |
| 1,414,483 | 5/1922 | Novitzky | 33/174 R |
| 2,431,100 | 11/1947 | Woods | 33/174 N |
| 3,149,422 | 9/1964 | McBroome | 33/174 N |

FOREIGN PATENT DOCUMENTS

| 128677 | 3/1902 | Fed. Rep. of Germany | 33/180 R |
|---|---|---|---|
| 395852 | 5/1924 | Fed. Rep. of Germany | 33/180 R |

Primary Examiner—Richard R. Stearns
Attorney, Agent, or Firm—H. Donald Volk; Billy G. Corber

[57] ABSTRACT

A gauge for measuring the distance and angle between two pipes is disclosed. The gauge consists of an elongated tubular body section adapted to be rigidly affixed to one of the pipes and including an extendable probe. A target plate is fitted over the other pipe and the extendable probe is brought into contact with the target plate. The angle between the target and the extendable probe, the eccentricity of the extendable probe and the target plate and the length of the combination of the tubular body and the extendable probe gives sufficient dimensions for cutting a curved section of pipe or pup.

3 Claims, 3 Drawing Figures

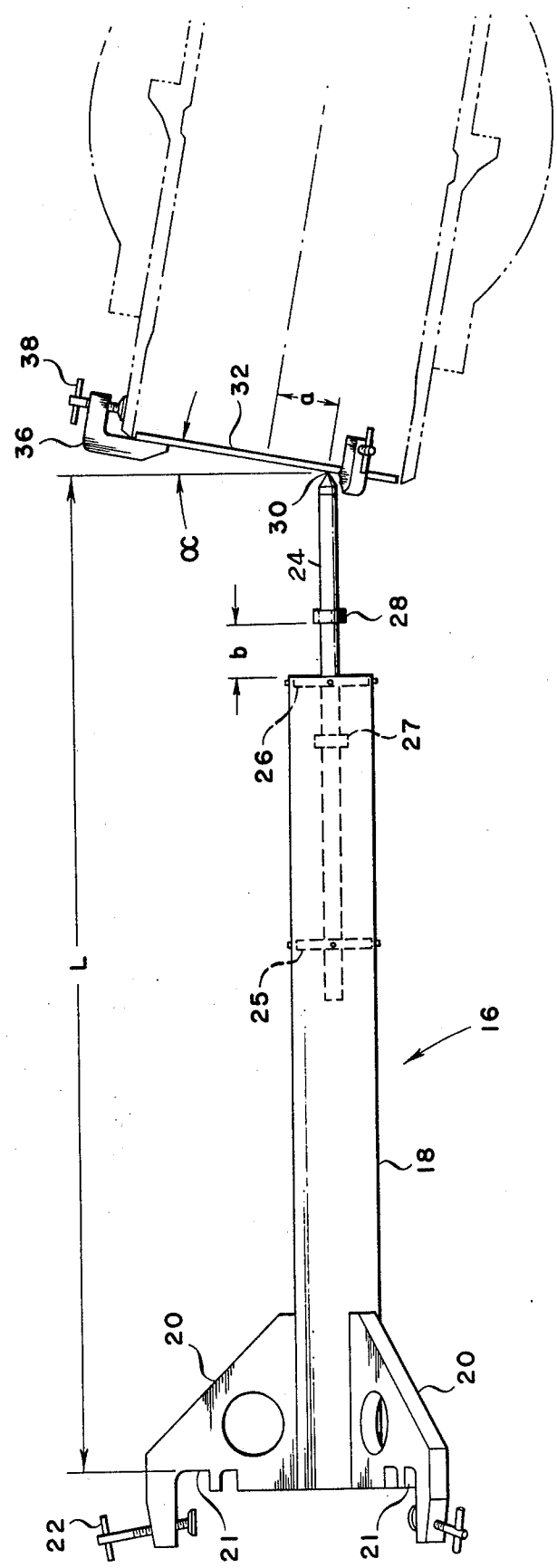

PUP MEASUREMENT GAUGE

BACKGROUND OF THE INVENTION

U.S. Pat. No. 3,599,436 describes the method and apparatus for joining a subsea pipeline to a riser wherein a submersible work chamber is placed over the adjacent ends of the submerged pipeline and the riser. The seawater is then evacuated from the chamber and the pressure is maintained to permit divers to weld the ends together. This technique is limited to relatively shallow depths of approximately 250 to 300 feet. Another method and apparatus for joining a subsea pipeline to a riser is shown in U.S. Pat. No. 3,967,462 in which a submersible work chamber is attached to an offshore platform. A winch on the platform is attached to the cable passing through the riser and chamber and is used to pull an end of the pipeline into the chamber. Personnel utilizing a capsule then enter the chamber for completing and joining the pipeline and riser. One problem encountered is determining the size and shape of the small section of pipe, commonly referred to as a pup, and joining the pipeline to the riser.

One technique used in the past is to take a straight section of pipe and using an iterative method, miter it until there was a reasonably good fit and then weld the miter pup in position. This technique is less than ideal because the ends of a mitered pipe are eliptical and not circular and except for very small angles cannot be easily welded to the round pipes.

Another previously used technique is to weld together pieces of pipe and then transport those pieces to a surface vessel where the measurements are taken so that a fitted section of pipe can be cut.

SUMMARY OF THE INVENTION

The apparatus of the present invention includes a lightweight portable gauge for measuring the dimensions of the pup. This pup measurement gauge can be carried by the personnel in the capsule to the chamber. They can make the measurements in the chamber and transmit the measurements to personnel on the platform who fabricate the pup. The pup can then be transported by the capsule to the chamber and welded in place, thus completing the pipeline.

Other features and advantages of the present invention will become more apparent from the following detailed description, the typical forms, and applications of the invention taken in conjunction with the accompanying drawings.

BRIEF DESCRIPTION OF THE DRAWINGS

FIG. 3 is a sideview of the pup measurement gauge showing the overall arrangement of the present apparatus.

DESCRIPTION OF THE PREFERRED EMBODIMENT

Figure 1:
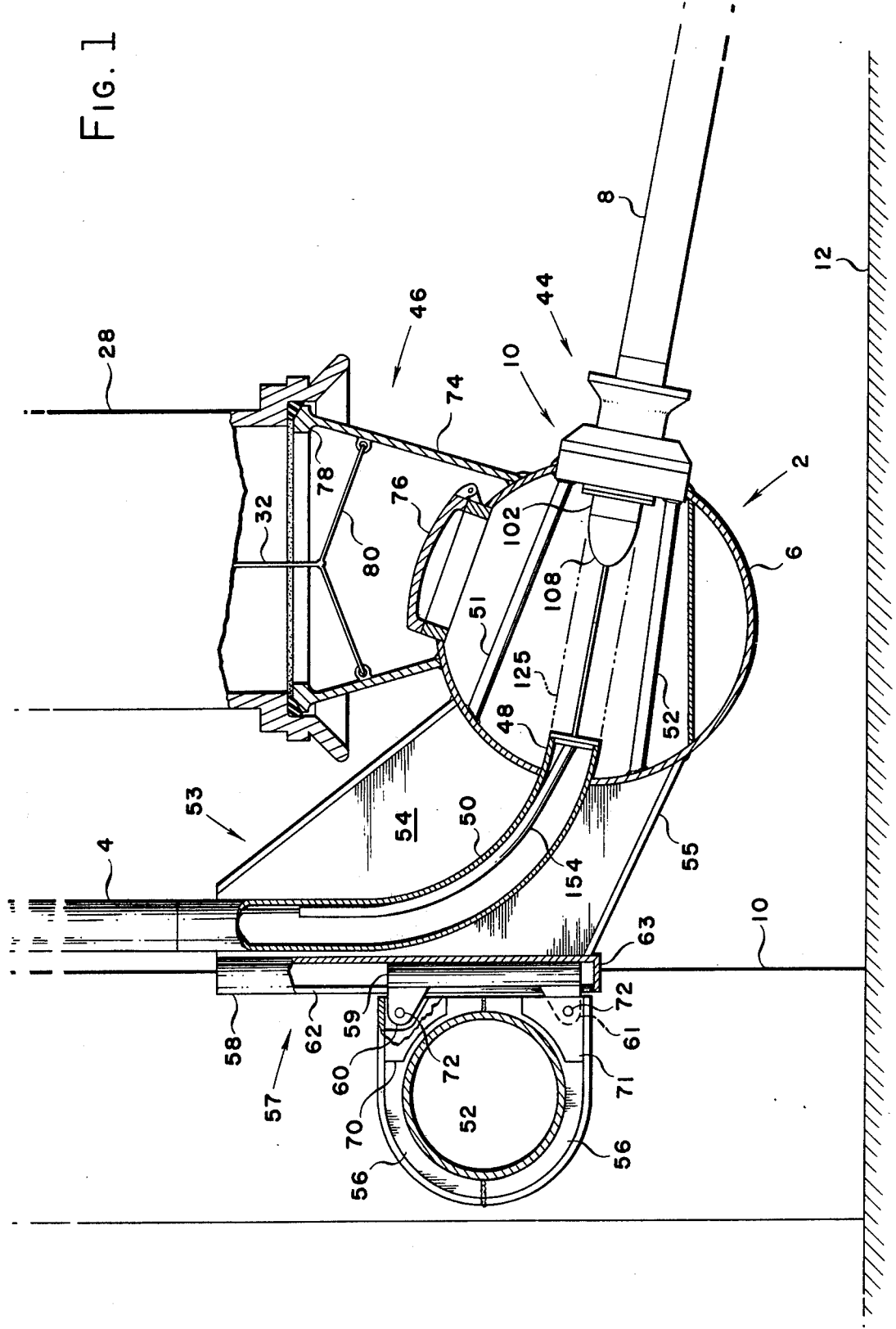
FIG. 1 is a side elevation view showing the pipeline and capsule joined to the chamber.

FIG. 1 shows one leg of an offshore platform 2. A riser pipe 4 is attached to the platform. Subtending the riser is a joint chamber 6. A pipeline 8 is attached to the joint chamber through a swivelable port means 10.

Figure 2:
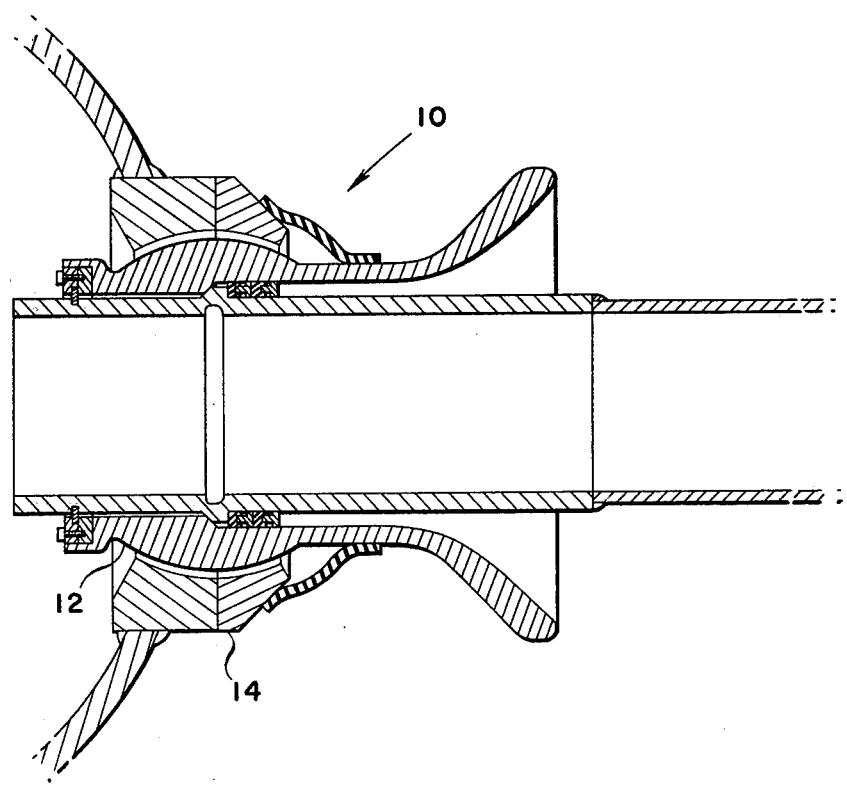
FIG. 2 is an enlarged elevation view of the chamber port means with a pipeline end portion fitted through the port means.

As shown more clearly in FIG. 2, the swivelable port means 10 includes a ball member 12 pivotable within socket member 14. This ball and socket arrangement, which can be swiveled about 10 degrees in the centerline, is particularly useful for pulling large diameter pipelines into the port. The pipelines range from 12 to 48 inches in diameter and have limited flexibility so the ball and socket arrangement allows them to be introduced into the chamber up to 10 degrees out of alignment with the centerline of the ball and socket arrangement. This possible misalignment simplifies the insertion of a pipeline into the joint chamber but makes it difficult to determine the size and shape of the pup necessary to connect the pipeline to the riser pipe. The apparatus of the present invention solves the pup measurement problem.

As can be seen in FIG. 1, the riser centerline passes through the swivelable port center. Because of this fact, mathematical equations which describe the pup can be developed. By measuring the length L, length a and angle α as shown in FIG. 3, and by knowing the predetermined bend radius of the pup blank, the dimensions and shape of the proposed pup can be determined by simple geometry. The particular mathematical formulas are set forth in a paper entitled "Subsea Pipeline Connections Completed by Welding at Atmospheric Pressure" written by M. D. Feller, a co-inventor of this case, and published by Spearhead Exhibitions Ltd., Rowe House, 55/59 Fife Road, Kingston-upon-Thames, Surrey, England.

Referring to FIG. 3, the pup measurement gauge 16 includes an elongated tubular body 18. Attached to one end of the elongated tubular body 18 are a plurality of feet 20. In the preferred embodiment three feet are attached to the tubular body, but it is understood that more feet may be attached if desired. Each foot 20 contains at least one slot 21. Slots 21 define a circle having a diameter the size of the pipe to be connected. Clamping means such as clamps 22 are attached to each of the feet for clamping gauge 16 to the riser. Telescopically mounted to the other end of tubular body 18 is an extendable probe 24. The probe is held concentric by linear bearings 25 and 26 while allowing it to move axially. Locking rings 27 and 28 act as stops to limit its travel. Extendable probe 24 terminates in a tapered point 30.

A flat circular plate 32 is centered and clamped on to the end of pipeline 8 by means of protrusions 36 and screw clamps 38. Enscribed or otherwise marked on the flat circular plate are a plurality of concentric circles.

The tapered point 30 of extendable probe 24 is brought into contact with the face of flat circular plate 32 and locked in position. Measurement of the eccentricity of the point in the flat circular plate is then measured by the use of the concentric circles. The maximum angle between the flat circular plate and a line normal to the centerline of the extendable probe also is measured by the use of a precision protractor. The length of the pup measurement gauge can then be measured by either measuring the total length or measuring the distance between the end of the tubular member and a fixed reference on the extendable probe. These measurements can then be transmitted to a surface ship or to the offshore platform for the fabrication of the pup.

While we have illustrated and described the preferred embodiment of our invention, it is to be understood that it is capable of variations and modifications, and we therefore do not wish to be limited to the precise details set forth, but desire to avail ourselves of such changes and alterations as fall within the purview of the following claims.

What is claimed is:

1. A guage for measuring the distance and angle between the ends of two pipes comprising:

a first means and a second means, said first means including means for rigidly attaching said means to an annular pipe and including a flat surface, located by such attaching means in a predetermined position with respect to said pipe, said second means including an elongated tubular body having a first and second end, said first end including means to rigidly attach said second means to the end of an annular pipe and position said tubular body in a predetermined orientation with respect to the axis of said pipe, said second means including an extendable probe mounted in said tubular body for longitudinal movement with respect thereto for contacting the flat surface of said first means.

2. The guage of claim 1 wherein said means for attaching said second means to the end of an annular pipe includes a plurality of feet, each foot including a slot for receiving the end of said annular pipe, and clamping means on each foot for rigidly attaching the second means to the annular pipe.

3. The guage of claim 2 wherein said extendable probe includes a first and second locking ring cooperating with the second end of said tubular body for limiting the travel of said probe.